United States Patent [19]

Lundholm

[11] 4,417,444
[45] Nov. 29, 1983

[54] STIRLING CYCLE ENGINE

[75] Inventor: Gunnar Lundholm, Lund, Sweden

[73] Assignee: Mechanical Technology Incorporated, Latham, N.Y.

[21] Appl. No.: 308,251

[22] Filed: Oct. 5, 1981

[51] Int. Cl.³ .............................................. F02G 1/00
[52] U.S. Cl. ...................................... 60/525; 60/517
[58] Field of Search ................... 60/517, 521, 522, 525

[56] References Cited

U.S. PATENT DOCUMENTS

| | | | |
|---|---|---|---|
| 3,859,792 | 1/1975 | Reinink | 60/521 |
| 3,927,529 | 12/1975 | Hakansson | 60/521 |
| 4,161,866 | 7/1979 | Kamiyama | 60/517 |

Primary Examiner—Allen M. Ostrager
Assistant Examiner—Stephen F. Husar
Attorney, Agent, or Firm—Joseph V. Claeys; Arthur N. Trausch, III

[57] ABSTRACT

In a Stirling cycle engine having a plurality of working gas charges separated by pistons reciprocating in cylinders, the total gas content is minimized and the mean pressure equalization among the serial cylinders is improved by using two piston rings axially spaced at least as much as the piston stroke and by providing a duct in the cylinder wall opening in the space between the two piston rings and leading to a source of minimum or maximum working gas pressure.

11 Claims, 1 Drawing Figure

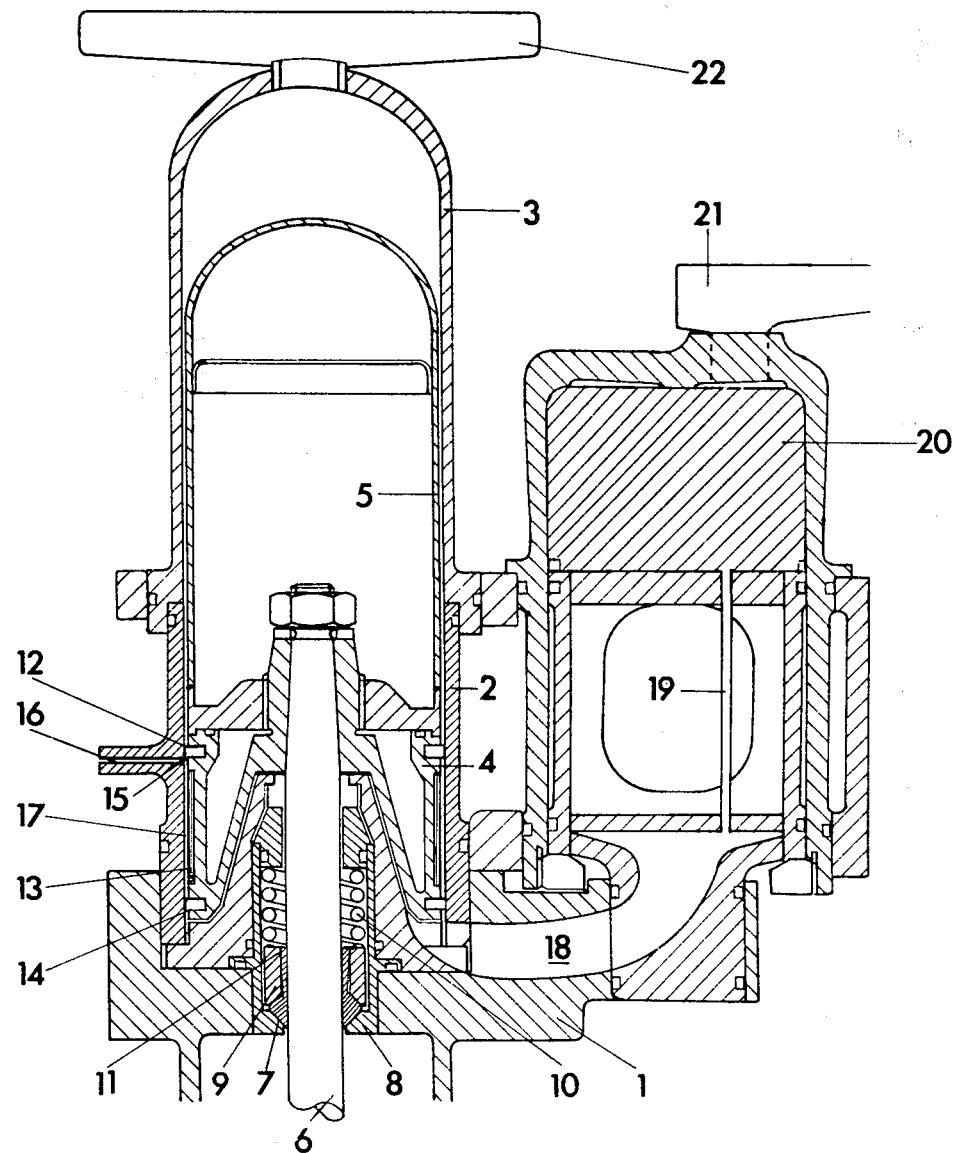

STIRLING CYCLE ENGINE

TECHNICAL FIELD

The Government of the United States of America has rights in this invention pursuant to Contract No. DEN3-32 awarded by the U.S. Department of Energy.

This invention relates to a multi-cylinder double acting Stirling cycle engine of the kind in which each cylinder contains a reciprocating piston separating a low temperature working space from a high temperature working space in the cylinder. Each piston separates two different charges of working gas from each other by means of at least two axially spaced piston rings. The charges of working gas on opposite sides of the piston operate in different phases of the Stirling cycle, so there is a substantial pressure difference across the piston for most of the cycle.

In Stirling engines of high efficiency and high power density, a working gas such as hydrogen is used at high mean pressure, usually on the order of about 80 bar. The high pressure working gas provides an excellent heat transfer medium without incurring excessive flow losses. However, it does present some sealing problems.

One of these sealing problems is leakage of working gas around the piston from one working space to the next. Leakage of working gas around the pistons represents direct power loss in the engine and introduces a possibility that the mean pressure of one of the working gas charges may become greater than that of the other working gas charges. A high mean pressure results in a higher output from the affected cylinders, thus causing an uneven power distribution among the cylinders of the engine.

BACKGROUND ART

The problems caused by internal gas leakage in the engine have been explained in the U.S. Pat. No. 3,927,529, which also contains one solution of the problem, viz. a connection between a space confined between two piston rings of a piston and its hollow dome. This solution of the problem is an effective and practical scheme for most applications. However, in automotive applications, where it is common practice to govern the power output of a Stirling cycle engine by adjusting the mean pressure of the working gas charges, the engine volumes containing working gas should be kept as small as possible so that the power output may be changed rapidly.

Changes in mean gas pressure require the use of a compressor, and in the interests of efficiency and fast response time, the work to be exerted by the compressor should be as small as possible. Although the gas contained in the hollow piston domes does not form an active part of the working gas charges and does not participate in the pressure fluctuations of the Stirling cycle, it does contribute to the total gas content, which has a negative effect on the power control responsiveness and on the compressor work.

SUMMARY OF THE INVENTION

Therefore it is an object of the present invention to isolate the dome volumes from the working spaces, and to provide alternative means for ensuring equal mean pressures in the working gas charges separated by the pistons.

According to the present invention, these objects attained by placing two adjacent piston rings in each piston at an axial spacing equal at least to the piston stroke, and providing a duct opening in the cylinder wall between the rings at an axial position that will not be passed by either of the two piston rings during their reciprocating movement. The duct leads to a source of working gas at extreme working gas pressure.

DESCRIPTION OF THE DRAWING

The invention will be described in more detail with reference to the drawing which is a sectional elevation through a single piston/cylinder and cooler/regenerator canister of a multi-cylinder Stirling engine according to the invention. The piston is shown at bottom dead center.

DESCRIPTION OF THE PREFERRED EMBODIMENT

The construction shown comprises a base plate 1 in which a cylinder liner 2 of a strong, corrosion resistant material such as stainless steel is mounted. A cylinder top 3 made of high temperature resistant material such as Climax Molybdenum XF818 is mounted as an upward extension of the liner 2. A piston 4, formed of a strong medium carbon alloy steel such as AISI 4340, is provided with a hollow dome 5, also of high temperature resistant material such as Inconel 718. A piston rod 6 is connected to the piston 4 and is mounted for reciprocation in the cylinder defined by the liner 2 and the top 3.

The piston rod 6 passes through the base plate 1, and is sealed therein against escape of working gas between the rod 6 and the base plate 1 by a sealing device which has been described in U.S. patent application Ser. No. 100,967, now U.S. Pat. No. 4,251,081 and does not form any part of the present invention. In short said sealing device consists of a polymer gland 7 having a cylindrical base corresponding to the diameter of the piston rod 6. The gland is sandwiched between a pair of conical surfaces on metal elements 8 and 9 which are spring biased toward each other by a prestressed coil spring 10 bearing on the element 9. The gland 7 is provided with a conically diverging extension 11 leaving a slightly widening gap between the piston rod 6 and the extension in upwards direction. Oil is supplied to the piston rod by means not shown in a crankcase below the base plate 1 and some oil is drawn through the gland 7 but is pumped back towards the crankcase as soon as it accumulates slightly in the gap between the rod 6 and the extension 11.

The piston 4 is provided with an upper piston ring 12, a guide ring 13 and a lower piston ring 14, all being formed of a strong, self-lubricating, inert material such as Rulon LD, a proprietary, reinforced polytetraflourethylene material available from the Dixon Industries Corporation of Bristol, R.I. The axial distance between the rings 12 and 14 is larger than the piston stroke defined by a crankshaft not shown. A duct opening 15 is located in the cylinder liner 2 just below the upper piston ring 12 when the piston 4 is in its lowermost position, as shown. The duct opening 15 is for a duct 16 connecting the space 17 between the piston rings 12 and 14 with a gas source held at maximum working cycle gas pressure, said source not being shown.

Alternatively a source of gas held at minimum cycle pressure may be used.

The piston 4 separates a working gas charge in a high temperature working space above the piston from another working gas charge in a low temperature working space below the piston. The gas charge below the piston 4 is present also in a duct 18, a gas cooler (symbolized by a single cooler tube 19 but containing a large number of such tubes), a regenerator 20, a gas manifold 21 and a bundle of heater tubes (not shown) connecting the manifold 21 with a cylinder manifold of the next adjacent cylinder top (not shown).

The gas charge above the piston 4 is located above the dome 5 and is also located in a manifold 22, a bundle of heater tubes (not shown) and a manifold, a regenerator, a cooler, a duct and a space below another piston—all such elements not being shown but corresponding to the elements 18–21.

The working principles of the engine is well known and has been described e.g. in the above mentioned U.S. Pat. No. 3,927,529. In short, the cyclic variations in the pressure of the gas charge above the piston 4 are 90 degrees displaced relative to the variations of the pressure below the piston 4. This causes a gas pressure force to be exerted on the piston 4 and a power output of the engine.

If the space defined between two piston rings of the piston 4 were connected to the hollow dome of the piston, different leak rates of different individual piston rings could cause the pressures in the different domes of the engine to differ. This, in turn, would cause mean pressure differences of the different charges of working gas. With the presently described system, the pressures between the two piston rings of all the pistons in the engine are kept equal by connecting all together. Thus the mean pressures in all the working spaces are kept equal.

The space 17 between the piston rings 12 and 14 and the cylinder wall can be made extremely narrow so that it will have little influence upon the response time of the power control system and will not cause any extra load on the gas compressor necessary for maintaining a reservoir of high pressure working gas.

Obviously, numerous modifications and variations of the preferred embodiment disclosed herein are possible in light of this disclosure.

It is to be expressly understood, therefore, that these modifications and variations, and the equivalents thereof, may be practiced while remaining within the spirit and scope of the invention defined by the following claims, wherein I claim:

1. A multi-cylinder double-acting Stirling cycle engine of the kind in which each cylinder contains a piston mounted to reciprocate therein, separating a low temperature working space from a high temperature working space in the cylinder, and in which each piston separates two different charges of working gas from each other, wherein the improvement comprises:

at least two axially spaced piston rings disposed on each of said pistons, with an axial spacing between said piston rings being at least equal to the stroke of said piston;

each of said cylinders is defined by a cylinder wall provided with a duct opening having such axial position that it will not be passed by either of said piston rings during their reciprocating movement, said duct opening belonging to a duct leading to a source of working gas at an extreme working cycle gas pressure.

2. The engine defined in claim 1, wherein said piston between said piston rings is reduced in diameter and a guide ring is disposed in said reduced diameter portion.

3. The engine defined in claim 1, wherein said extreme working cycle gas pressure source is maintained at the maximum cycle pressure.

4. The engine defined in claim 1, wherein said extreme working cycle gas pressure source is maintained at the minimum cycle pressure.

5. The engine defined in claim 1, wherein said ducts from all of said cylinders are connected to a common source.

6. The engine defined in claim 1, wherein said piston rings are spaced axially apart a distance exceeding the piston stroke by just enough to prevent either of said rings from reaching said duct opening at the extremities of the piston stroke.

7. The engine defined in claim 6, wherein said duct opening is disposed in said cylinder wall at the midpoint position between said piston rings when said piston is at its midstroke position.

8. The engine defined in claim 1, wherein said duct opening is in a cylinder liner mounted at one end thereof in an engine base plate and having mounted on the other end a cylinder extension, said cylinder liner having an axial length just slightly exceeding the piston stroke and formed of a material that provides a suitable wear surface for said piston rings.

9. The engine defined in claim 8, wherein said cylinder liner is formed of a corrosion resistant metal, and said piston rings are formed of a strong, self-lubricating, inert organic polymer.

10. The engine defined in claim 1, wherein said piston includes a hollow top dome of high temperature resistant material substantially sealed against entry of gas from either of said working spaces and a lower portion of a strong lower temperature material in which said piston rings are mounted.

11. The engine defined in claim 9, wherein said piston lower portion includes a central, downwardly opening well which telescopically receives a piston rod seal assembly when said piston is at the bottom of its stroke, said piston lower portion having a lower extremity in the form of a depending skirt that receives one of said piston rings.

* * * * *